May 29, 1923.
J. GOTTWALD ET AL
ANIMAL TRAP
Filed Oct. 1, 1921
1,456,733
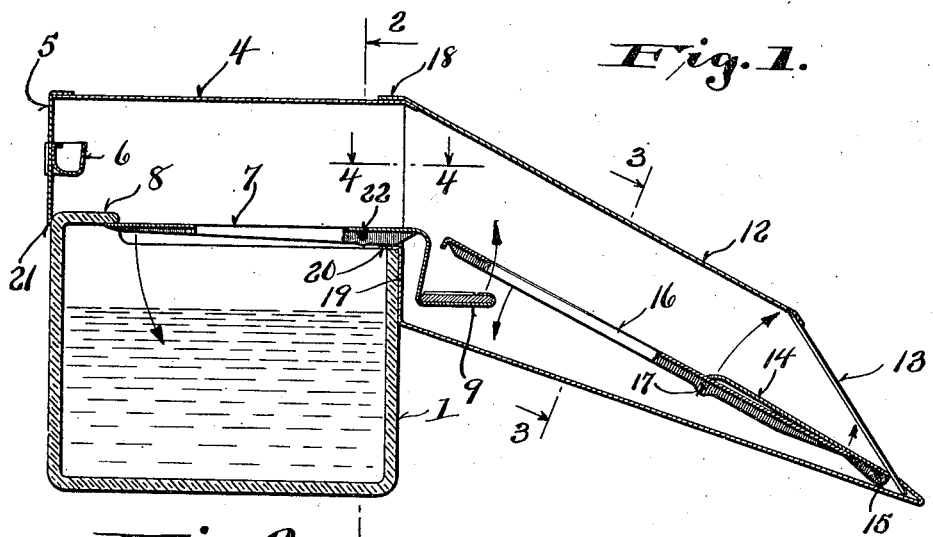
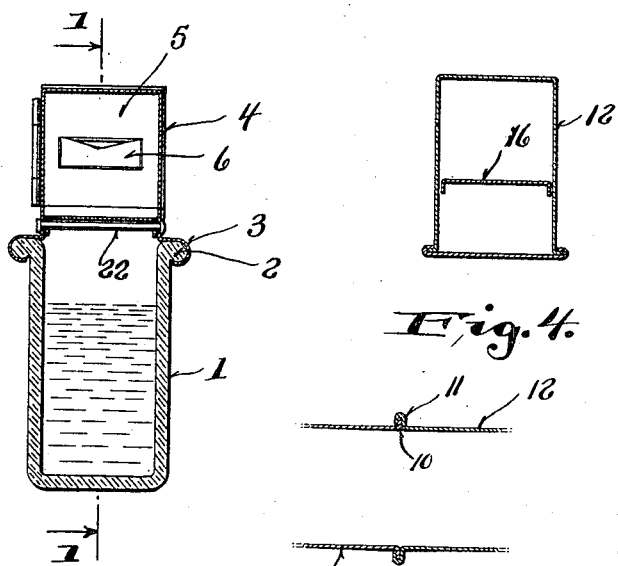
Witnesses!
Robert E. Weber
Inventors!
Joseph Gottwald
Adam Poster
By Young and Young
Attorneys!

Patented May 29, 1923.

1,456,733

UNITED STATES PATENT OFFICE.

JOSEPH GOTTWALD AND ADAM POSLER, OF THERESA, WISCONSIN.

ANIMAL TRAP.

Application filed October 1, 1921. Serial No. 504,601.

*To all whom it may concern:*

Be it known that we, JOSEPH GOTTWALD and ADAM POSLER, both citizens of the United States, and residents of Theresa, in the county of Dodge and State of Wisconsin, have invented certain new and useful Improvements in Animal Traps; and we do hereby declare that the following is a full, clear, and exact description thereof.

Our invention relates to a new and useful improvement in animal traps of the type in which, when the animal has been trapped, the device is automatically set for the next one.

The general object of the invention is to provide a device of this kind which is made up of a number of different parts which may be easily taken apart and cleaned.

It is also an object of the invention to provide a trap of this type with a receptacle in which the animal may be trapped and which is adapted to receive water or other liquid.

With the above and other objects in view the invention consists in certain details of construction and combination of parts which will be hereinafter described in connection with the accompanying drawing.

In the drawing:—

Figure 1 is a vertical longitudinal sectional view of our invention.

Figure 2 is a transverse sectional view on the line 2—2 of Figure 1.

Figure 3 is a transverse sectional view on the line 3—3 of Figure 1, and

Figure 4 is a detail sectional view on the line 4—4 of Figure 1.

Referring specifically to the drawing the numeral 1 indicates a receptacle adapted to contain water or other liquid and preferably made of glass or other non-corrosive material. The upper side edges of the receptacle are formed with lateral flanges 2 which slidably receive the lower extended edges 3 of a casing 4 which is provided at its rear end with a door 5 having a suitable holder 6 for receiving the bait. The casing 4 is provided with a bottom 7 which is pivotally mounted on the removable pin 22 and constitutes a trap door through which the animal may be precipitated into the receptacle below. The rear side of the receptacle is formed with a forwardly extending flange 8 against which the rear end of the trap door normally engages, being held in this position by the counter-weight 9. The forward side edges of the casing 4 are provided with flanges 10 which slidably receive the vertical guideways 11 formed on the rear end of a passageway 12 through which the animal approaches the bait. The passageway is provided at its front end with an opening 13 which is provided with a door 14 pivoted at 15 to swing upwardly to close the entrance. A runway 16 is pivotally mounted at 17 in the lower portion of the passageway and is normally held in the position shown in Figure 1 by the weight of the door 14 which normally remains open as shown.

From the foregoing description it will readily be understood that the animal entering the opening 13 and approaching the rear of the trap will by his own weight on the runway 16 close the door 14 and thus prevent his escape. The animal then finding retreat impossible continues his course to the rear end of the trap door 7 which precipitates him into the liquid in the receptacle 1. As the trap door opens the forward flange which forms the counterweight 9 will restore the runway 16 to the position shown and permit the door 14 to open by gravity in readiness for another animal.

The passageway 12 is provided at its upper side with a rearwardly projecting flange 18 which rests upon the casing 4, the lower side of the passageway is formed with a vertical portion 19 which rests against the forward side of the receptacle and has a horizontally extending extremity 20 which rests upon the upper edge thereof. The door 5 extends downwardly at its central portion as shown at 21 so as to engage the rear edge of the receptacle thus securing the casing against displacement.

When it is desired to remove the receptacle to change the liquid contents thereof, or to clean the trap, it is necessary only to open the door 5 whereupon the casing 4 may readily be removed by sliding the same forwardly on the flanges 2 of the receptacle. The bolt 22 may then be removed thus releasing the trap door 7 and permitting the passageway 12 to slide vertically thus disengaging the guideways 11 from the flanges 10 and permitting it to be separated from the casing 4. It will be seen therefore that the device is easily disassembled so as to permit ready access to all portions of the interior thereof whenever it is necessary to clean the same. The entire trap may be cheaply manufactured from sheet metal and is thoroughly practicable and reliable in its operation.

We claim as our invention:—

In an animal trap, the combination of a receptacle containing liquid and having a horizontal forwardly extending flange, a casing secured thereto, a trap door pivoted on said casing adapted to contact along its rearward end with the front edge of said flange, a weight normally maintaining said trap door in elevated position, the front of said casing being prolonged to form a passageway, an entrance door pivoted adjacent the front of said passageway, a runway pivoted in said passageway, said entrance door being normally in lowered position but adapted to be raised by the weight of the animal on the rearward portion of said runway to close the entrance to said passageway, said weight being adapted to contact with said runway when said trap door is lowered.

In testimony that we claim the foregoing we have hereunto set our hands at Theresa in the county of Dodge and State of Wisconsin.

JOSEPH GOTTWALD.
ADAM POSLER.